(12) United States Patent
Xiang et al.

(10) Patent No.: US 11,209,726 B2
(45) Date of Patent: Dec. 28, 2021

(54) IMAGE ACQUISITION DEVICE

(71) Applicant: SHENZHEN SENSETIME TECHNOLOGY CO., LTD., Shenzhen (CN)

(72) Inventors: Xubo Xiang, Shenzhen (CN); Zhonghua She, Shenzhen (CN); Miaoran Xu, Shenzhen (CN); Conghong Zhong, Shenzhen (CN); Zhili Hu, Shenzhen (CN); Jian Li, Shenzhen (CN); Li Cao, Shenzhen (CN); Zhongfu Zhang, Shenzhen (CN); Shaoming Qin, Shenzhen (CN); Kun Ma, Shenzhen (CN)

(73) Assignee: SHENZHEN SENSETIME TECHNOLOGY CO., LTD., Shenzhen (CN)

(*) Notice: Subject to any disclaimer, the term of this patent is extended or adjusted under 35 U.S.C. 154(b) by 432 days.

(21) Appl. No.: 16/314,416

(22) PCT Filed: Jul. 25, 2018

(86) PCT No.: PCT/CN2018/097092
§ 371 (c)(1),
(2) Date: Dec. 29, 2018

(87) PCT Pub. No.: WO2019/056851
PCT Pub. Date: Mar. 28, 2019

(65) Prior Publication Data
US 2021/0223677 A1 Jul. 22, 2021

(30) Foreign Application Priority Data
Sep. 25, 2017 (CN) .......................... 201721240251.2

(51) Int. Cl.
G03B 37/02 (2021.01)
H04N 5/225 (2006.01)

(52) U.S. Cl.
CPC ............ *G03B 37/02* (2013.01); *H04N 5/2252* (2013.01)

(58) Field of Classification Search
None
See application file for complete search history.

(56) References Cited

U.S. PATENT DOCUMENTS 5,903,706 A 5/1999 Wakabayashi
6,930,725 B1 8/2005 Hayashi
(Continued)

FOREIGN PATENT DOCUMENTS

CN 1627770 A 6/2005
CN 201122222 Y 9/2008
(Continued)

OTHER PUBLICATIONS

First Office Action of the Korean application No. 10-2019-7021270, dated Aug. 20, 2020.
(Continued)

*Primary Examiner* — William B Perkey
(74) *Attorney, Agent, or Firm* — Syncoda LLC; Feng Ma

(57) ABSTRACT

An image acquisition device includes a main body and a camera. A rotating portion is provided on the main body. The camera is arranged on the rotating portion. A knob portion is provided on the rotating portion at a lateral side of the camera in the axial direction. The knob portion can drive the rotating portion to rotate.

12 Claims, 3 Drawing Sheets

(56) References Cited

U.S. PATENT DOCUMENTS

| | | | |
|---|---|---|---|
| 2004/0009790 A1* | 1/2004 | Im | H04N 5/2251 455/556.1 |
| 2004/0056977 A1* | 3/2004 | Kim | H04N 5/2251 348/376 |
| 2004/0080667 A1* | 4/2004 | Jeong | F16M 11/18 348/374 |
| 2004/0130644 A1* | 7/2004 | Park | H04M 1/0214 348/333.01 |
| 2005/0110887 A1 | 5/2005 | Shin | |
| 2005/0263600 A1* | 12/2005 | Yang | G06F 1/1626 235/472.01 |
| 2006/0216022 A1* | 9/2006 | Lee | H04M 1/0264 396/529 |
| 2008/0043434 A1 | 2/2008 | Tatsukami | |
| 2010/0081478 A1* | 4/2010 | Itoh | H04M 1/0245 455/566 |
| 2012/0063068 A1 | 3/2012 | Li | |
| 2016/0374212 A1 | 12/2016 | Gao et al. | |

FOREIGN PATENT DOCUMENTS

| | | |
|---|---|---|
| CN | 102404948 A | 4/2012 |
| CN | 204731810 U | 10/2015 |
| CN | 105872286 A | 8/2016 |
| CN | 205584314 U | 9/2016 |
| CN | 106200806 A | 12/2016 |
| CN | 206226557 U | 6/2017 |
| CN | 206260021 U | 6/2017 |
| CN | 207196002 U | 4/2018 |
| EP | 0969352 A2 | 1/2000 |
| JP | S63147993 U | 9/1988 |
| JP | 2000231859 A | 8/2000 |
| JP | 2004056383 A | 2/2004 |
| JP | 3642198 B2 | 4/2005 |
| JP | 2005295195 A | 10/2005 |
| JP | 2012080371 A | 4/2012 |
| KR | 20000006542 A | 1/2000 |
| KR | 20060033960 A | 4/2006 |
| KR | 100619801 B1 | 9/2006 |
| KR | 101478250 B1 | 12/2014 |

OTHER PUBLICATIONS

English translation of the Written Opinion of the International Search Authority in the international application No. PCT/CN2018/097092, dated Oct. 18, 2018.

First Office Action of the Japanese application No. 2019-562350, dated Jan. 12, 2021.

Second Office Action of the Korean application No. 10-2019-7021270, dated Feb. 9, 2021.

International Search Report in the international application No. PCT/CN2018/097092, dated Oct. 18, 2018.

Supplementary European Search Report in the European application No. 18859826.2, dated Mar. 11, 2020.

Written Opinion of the Singaporean application No. 11201911424R, dated Jun. 11, 2021.

Notice of Rejection of the Japanese application No. 2019-562350, dated Sep. 14, 2021.

\* cited by examiner

IMAGE ACQUISITION DEVICE

CROSS REFERENCE TO RELATED APPLICATION

The present application claims priority to China Patent Application No. 201721240251.2 filed on Sep. 25, 2017, the disclosure of which is hereby incorporated by reference in its entirety.

TECHNICAL FIELD

Embodiments of the present disclosure relate to the technical field of image acquisition, and in particular, to image acquisition device.

BACKGROUND

People often need cameras for image acquisition in their life or work, for example, performing operations such as chatting and authentication. To adjust the photographing angle, many cameras are configured to be rotatable, such that users can adjust the image acquisition angles by adjusting the angles of the cameras when there is a need to use the cameras. However, it would be easy to make lenses of the cameras dirty during angle adjustment. If the cameras get dirty, on one hand, the image acquisition effect would be affected, and on the other hand, cleaning is required, which increases the maintenance cost. Moreover, in the related art, angle adjustment of cameras is not convenient.

SUMMARY

The present disclosure provides an image acquisition device.

An image acquisition device provided according to an embodiment of the present disclosure includes a main body and a camera, where a rotating portion is provided on the main body; the camera is arranged on the rotating portion; a knob portion is provided on the rotating portion at a lateral side of the camera in the axial direction; and the knob portion can drive the rotating portion to rotate.

According to the image acquisition device provided by the embodiment of the present disclosure, a rotating portion is provided on the main body of the image acquisition device, a knob portion is provided on the rotating portion, and the camera is arranged on the rotating portion, such that when a user needs to rotate the camera, the user can adjust the knob portion to drive the camera to rotate. Since the knob portion is arranged at a lateral side of the camera and is away from the camera by a certain distance, the user would not touch the camera when operating the knob, so as not to make the camera dirty, thereby reducing the workload of maintaining the camera. In addition, the knob portion also makes it convenient for a user to turn the camera. The user can adjust the angle of the camera without rotating the camera, but only by rotating the knob, so that the operation is more convenient.

DESCRIPTION OF REFERENCE NUMERALS

Figure 1:
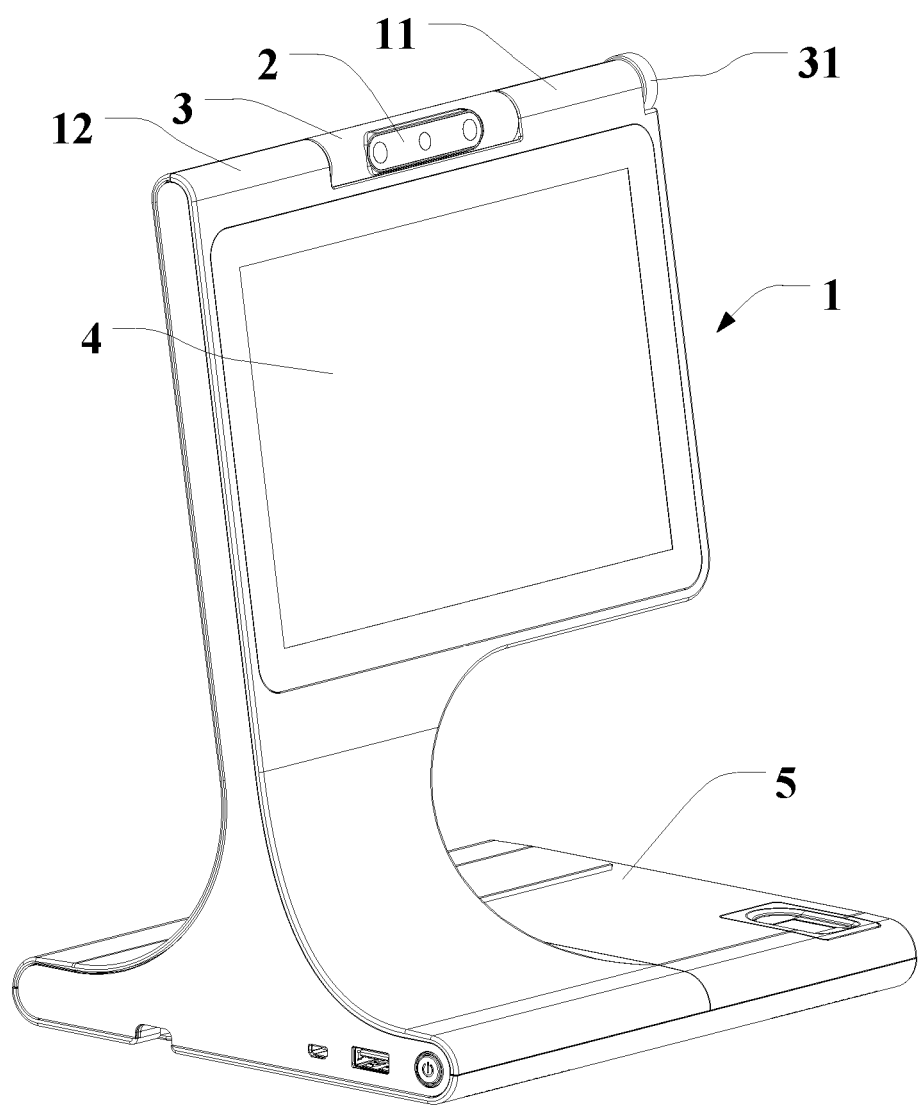
FIG. 1 is a diagram showing a state in which a camera body of an image acquisition device provided by an embodiment of the present disclosure is used.

1. Main body; 11. first rotation supporting portion; 12. second rotation supporting portion; 2. camera; 3. rotating portion; 31. knob portion; 4. screen; 5. base.

DETAILED DESCRIPTION

Exemplary embodiments of the present disclosure are now described in detail with reference to the accompanying drawings, but are not limited to the following embodiments.

This embodiment provides an image acquisition device, including a main body 1 and a camera 2. A rotating portion 3 is provided on the main body 1. The camera 2 is arranged on the rotating portion 3. A knob portion 31 is provided on the rotating portion 3 at a lateral side of the camera 2 in the axial direction. The knob portion 31 can drive the rotating portion 3 to rotate.

The axial direction here may include a direction in which a connection line between the camera 2 and the knob portion 31 is located.

The main body 1 of the image acquisition device is not specifically defined, and may include a display screen, a support, and an input unit, etc. The rotating portion 3 may be arranged at any position on the main body 1 of the image acquisition device. The camera 2 is embedded in the rotating portion 3, and may be rotated along with the rotating portion 3 to adjust the camera 2 at different angles. The knob portion 31 is arranged on the rotating portion 3. A user can rotate the rotating portion 3 by rotating the knob portion 31, thereby driving the camera 2 to rotate.

According to the image acquisition device provided by this embodiment, a rotating portion 3 is provided on the main body 1 of the image acquisition device, a knob portion 31 is provided on the rotating portion 3, and the camera 2 is arranged on the rotating portion 3, such that when a user needs to rotate the camera 2, the user can adjust the knob portion 31 to drive the camera 2 to rotate. Since the knob portion 31 is arranged at a lateral side of the camera 2 and is away from the camera 2 by a certain distance, the user does not touch the camera 2 when operating the knob, so as not to make the camera 2 dirty, thereby reducing the workload of maintaining the camera 2. In addition, the knob portion 31 also makes it convenient for a user to turn the camera. The user does not need to rotate the camera 2, but only needs to rotate the knob to adjust the angle of the camera, and the operation is more convenient.

Optionally, the knob portion 31 is arranged at an outer edge of the main body 1. Since the knob portion 31 is arranged at the outer edge, it is distant from the position where the camera 2 is arranged. On one hand, the dirt caused by directly rotating the camera is avoided, and on the other hand, contamination of the camera caused by misoperation due to too short distance is avoided.

In some embodiments, the camera 2 is arranged at the middle of an edge of the main body 1. Disposing the camera 2 at the middle of an edge, on one hand, facilitates image acquisition, conforms to the characteristics of image acquisition of the user, and would not cause image shift (for example, the camera is located at an edge may cause acquired portraits to be located at an edge of the images) and other problems with respect to disposition at an end. On the other hand, the knob portion 31 is arranged at the outer edge of the main body 1, thereby maximizing the distance between the camera 2 and the knob portion 31.

As shown in FIG. 1, the knob portion 31 is arranged at the outer edge of the main body 1 of the image acquisition device to facilitate operating the knob portion 31 by the user. The knob portion 31 may protrude from the outer edge of the main body 1, may also be received in the main body, and certainly may also be arranged at any other position where the knob portion can be arranged.

If the knob portion 31 may protrude from the outer edge of the main body 1, the operation of the user may be facilitated. In this way, compared with the case where the knob portion 31 is flush with the main body 1, the user's fingers can work more effectively, thereby facilitating adjustment.

Certainly, in some embodiments, the knob portion 31 may also be flush with the outer edge of the main body 1. However, to facilitate rotation, a gap is provided between the knob portion 31 and the main body 1. The gap enables the user's fingers to work conveniently, and therefore also has the function of facilitating adjustment.

Optionally, a first rotation supporting portion 11 is provided on the main body 1. The rotating portion 3 is rotatably supported by the rotation supporting portion. The camera 2 and the knob portion 31 are arranged on both sides of the first rotation supporting portion 11, respectively.

In this embodiment, the first rotation supporting portion 11 is cylindrical. The rotating portion 3 passes through the first rotation supporting portion 11. Both ends of the rotating portion 3 are located outside the first rotation supporting portion 11. The camera 2 is arranged at one side of the first rotation supporting portion 11, and the knob portion 31 is arranged at the other side of the first rotation supporting portion 11.

Optionally, a second rotation supporting portion 12 is provided on the main body 1, and the camera 2 is located between the first rotation supporting portion 11 and the second rotation supporting portion 12.

Figure 2:
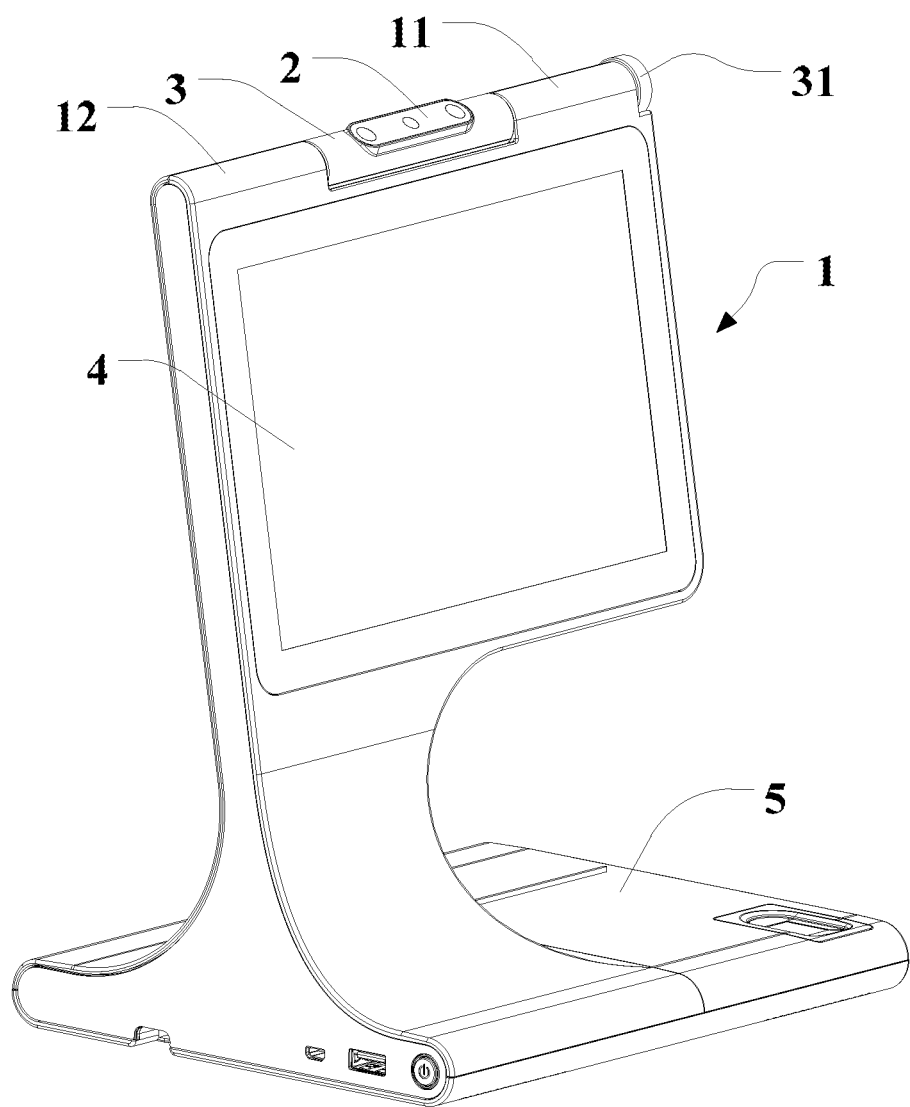
FIG. 2 is a diagram showing a state in which a camera body of an image acquisition device provided by an embodiment of the present disclosure is rotated upward.
Figure 3:
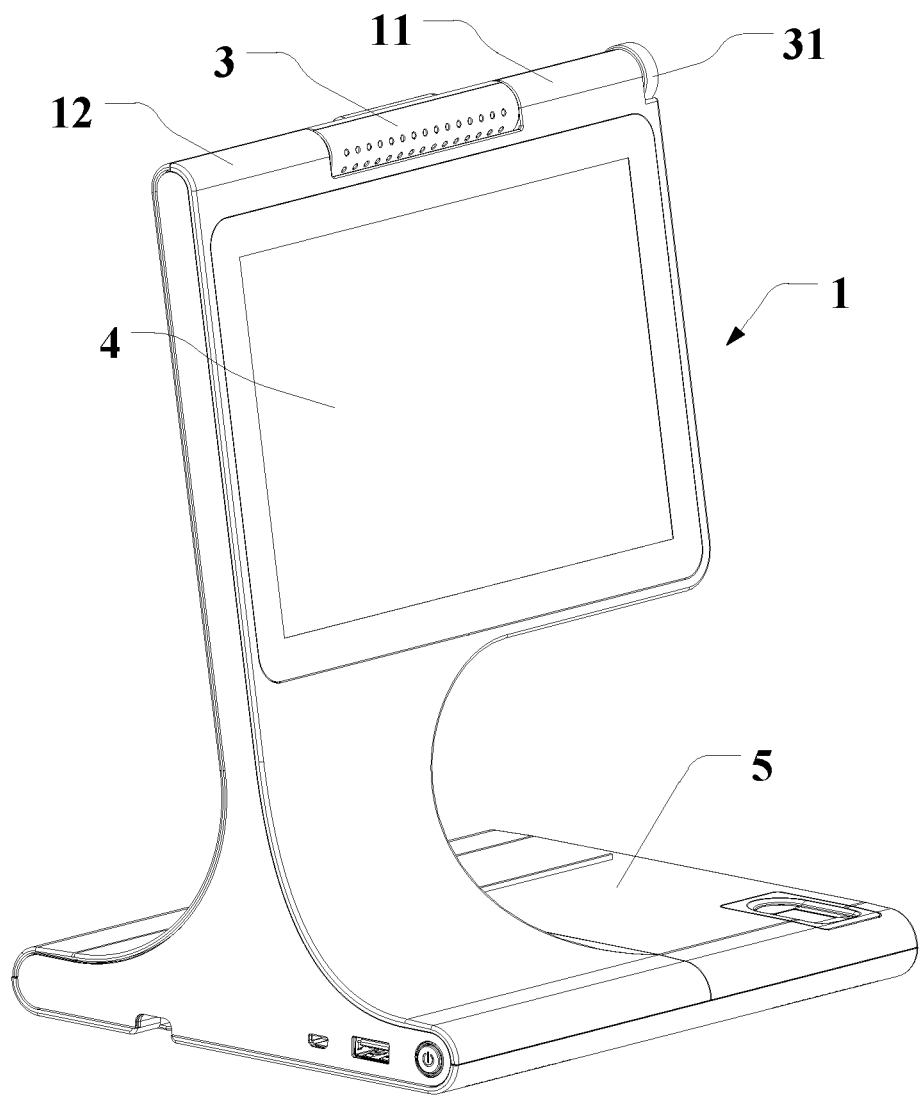
FIG. 3 is a diagram showing a state in which a camera body of an image acquisition device provided by an embodiment of the present disclosure is not used.

As shown in FIG. 1 to FIG. 3, an accommodating space is reserved between the first rotation supporting portion 11 and the second rotation supporting portion 12, and the camera 2 is arranged in the accommodating space. The rotating portion 3 is separately provided on the first rotation supporting portion 11 and the second rotation supporting portion 12. The camera 2 is connected to the rotating portion 3 in the first rotation supporting portion 11 and the second rotation supporting portion 12 separately. The user can adjust the camera 2 by rotating the rotating portion 3 on the first rotation supporting portion 11, and can also adjust the camera 2 by rotating the rotating portion 3 on the second rotation supporting portion 12.

Optionally, the first rotation supporting portion 11 and the second rotation supporting portion 12 protrude from the main body 1, and an accommodating space configured to accommodate the rotating portion 3 is formed between the first rotation supporting portion 11 and the second rotation supporting portion 12.

As shown in FIG. 1 to FIG. 3, the first rotation supporting portion 11 and the second rotation supporting portion 12 protrude from the main body 1 of the image acquisition device in this embodiment. In this way, it is more convenient and flexible to mount the camera 2.

Optionally, a pattern for increasing friction is provided on the knob portion 31. The pattern for increasing friction enables the user's fingers to work conveniently during adjustment, thereby reducing effort needed for the adjustment.

The pattern increases the friction of the knob portion 31, and can facilitate the user's operations. The structure of the pattern in this embodiment is not specifically defined, and may be linear, a V-shaped, polygonal, etc.

In some other embodiments, the knob portion 31 is provided with an adjustment scale, and the adjustment scale may be configured to measure the angle of adjustment of the camera. In this way, the user can conveniently adjust the orientation or the acquisition angle of the camera accurately according to the adjustment scale.

Optionally, the main body 1 of the image acquisition device further includes a screen 4, and the rotating portion 3 is arranged at the upward side, the downward side, a lateral side, or the back side of the screen 4. The upward side here may be the side of the screen 4 distant from a base 5. The downward side is opposite to the upward side, and may be the end of the screen connected to the base 5. The lateral side may be the side that either of the lateral surfaces of a display surface of the screen 4 faces. The lateral surfaces here are connected to the top edge and the bottom edge of the screen 4. The back side here may be the surface of the screen 4 facing away from the display surface. The display surface is the surface of the screen 4 that displays images.

Optionally, in this embodiment, the rotating portion 3 is arranged at the upward side of the screen 4, that is, the camera 2 is arranged at the upward side of the screen 4, to facilitate image acquisition of the user. However, no limitation is made thereto, and the rotating portion 3 may be arranged at any position where there is a need to mount the rotating portion 3. In other achievable modes, multiple rotating portions 3 may also be provided on one screen 4, that is, multiple cameras 2 are provided, to meet user requirements.

Optionally, as shown in FIG. 1, the rotating portion 3 is arranged at the upward side of the screen 4, and the axis of the rotating portion 3 extends in a horizontal direction.

As shown in FIG. 1 to FIG. 3, in this embodiment, the rotating portion 3 is arranged at the upward side of the screen 4, and the rotation supporting portions and the camera 2 are also arranged at the upward side of the screen 4. The rotating portion 3 is arranged in the length direction of the screen 4. The knob portion 31 is arranged outside the rotating portion 3. The camera 2 is arranged inside the rotating portion 3. The user can adjust the angle of the camera 2 conveniently by rotating the knob portion 31.

Optionally, the rotating portion 3 is cylindrical. By configuring the rotating portion 3 as a cylindrical body, on one hand, the camera is mounted in the inner space of the cylindrical body, and on the other hand, smooth rotation is performed using the circumferential surface of the cylindrical body facilitates.

The shape of the rotating portion 3 is not specifically defined, and may be any shape such as a cuboid and a cylinder. The rotating portion 3 in this embodiment is cylindrical, so as to facilitate rotation of the rotating portion 3, and prevent the rotating portion 3 from interfering with the main body 1 of the image acquisition device during rotation.

Optionally, the camera 2 protrudes from the rotating portion 3, and the part of the main body 1 opposite to the camera 2 in position is provided with a notch adapted to the camera 2.

As shown in FIG. 1 to FIG. 3, by providing a notch on the body of the image acquisition device, when the camera 2 is not used, the camera 2 can be hidden to protect the camera 2, thereby preventing the camera 2 from being damaged, and protecting the surface of the camera 2 against dust. The notch is provided on the main body 1 at a position opposite to the camera 2. When the camera 2 is no longer in use, the user can drive the knob portion 31 to turn the camera 2 into the notch, and when the camera 2 needs to be used again, the user can turn the camera 2 out. The cross-sectional shape of the notch is not specifically defined, and may be any position such as a polygon and a circular arc.

Optionally, the image acquisition device may further include at least one of an identity document reading portion and a fingerprint reading portion.

The image acquisition device can read identity documents, such as the ID card and work card, of a user by means of the identity document reading portion to obtain identity document information of the user in real time, thereby meeting requirements for user identification, authentication, etc. The image acquisition device can identify a user's fingerprint by means of the fingerprint reading portion, and can perform operations such as authentication on the user by means of fingerprint identification. In this embodiment, the identity document reading portion and the fingerprint reading portion can be both provided in the image acquisition device according to requirements, and can also be mounted according to requirements. For example, the image acquisition device in this embodiment may be used as a person and identity document comparison device to perform comprehensive judgment by acquiring a person's image, such as a facial image, by means of the camera 2, identifying the person's information by means of the person's image, and comparing the information with identity document information acquired by the identity document reading portion or fingerprint information acquired by the fingerprint reading portion.

Optionally, the main body 1 includes a base 5, and at least one of the identity document reading portion and the fingerprint reading portion is arranged on the base 5.

The base 5 is arranged at the bottom of the image acquisition device. The identity document reading portion or the fingerprint reading portion is arranged on the base 5, so that the user can perform identify document identification and authentication or fingerprint identification and authentication conveniently.

According to the image acquisition device provided by this embodiment, a rotating portion is provided on the main body of the image acquisition device, a knob portion is provided on the rotating portion, and the camera is arranged on the rotating portion, such that when a user needs to rotate the camera, the user can adjust the knob portion to drive the camera to rotate. Since the knob portion is arranged at a lateral side of the camera and is away from the camera by a certain distance, the user would not touch the camera when operating the knob, so as not to make the camera dirty, thereby reducing the workload of maintaining the camera. In addition, the knob portion also makes it convenient for a user to turn the camera. The user can adjust the angle of the camera without rotating the camera, but only by rotating the knob, so that the operation is more convenient.

The descriptions above only involve specific implementations of the embodiments of the present application. However, the scope of protection of the embodiments of the present application is not limited thereto. Within the technical scope disclosed by the embodiments of the present disclosure, any variation or substitution that can be easily conceived of by those skilled in the art should all be included within the scope of protection of the embodiments of the present disclosure. Therefore, the scope of protection of the embodiments of the present disclosure should be defined by the scope of protection of the claims.

The invention claimed is:

1. An image acquisition device, comprising:
a main body;
a rotating portion provided on the main body;
a camera arranged on the rotating portion; and
a knob portion provided on the rotating portion at a lateral side of the camera in the axial direction, and the knob portion being configured to drive the rotating portion to rotate,
wherein the camera protrudes out of the rotating portion, and a part of the main body opposite to the camera in position is provided with a notch adapted to the camera.

2. The image acquisition device according to claim 1, wherein the knob portion is arranged at an outer edge of the main body.

3. The image acquisition device according to claim 2, further comprising:
a first rotation supporting portion provided on the main body and for rotatably supporting the rotating portion, and the camera and the knob portion being arranged on both sides of the first rotation supporting portion, respectively.

4. The image acquisition device according to claim 3, further comprising:
a second rotation supporting portion provided on the main body, and the camera being located between the first rotation supporting portion and the second rotation supporting portion.

5. The image acquisition device according to claim 4, wherein the first rotation supporting portion and the second rotation supporting portion protrude from the main body, and an accommodating space for accommodating the rotating portion is formed between the first rotation supporting portion and the second rotation supporting portion.

6. The image acquisition device according to claim 1, further comprising:
a pattern provided on the knob portion and for increasing friction.

7. The image acquisition device according to claim 1, wherein the main body further comprises a screen, wherein the rotating portion is arranged at an upward side, a downward side, a lateral side, or a back side of the screen.

8. The image acquisition device according to claim 7, wherein the rotating portion is arranged at the upward side of the screen, and the axis of the rotating portion extends in a horizontal direction.

9. The image acquisition device according to claim 8, wherein the rotating portion is cylindrical.

10. The image acquisition device according to claim 1, wherein the image acquisition device further comprises at least one of an identity document reading portion or a fingerprint reading portion.

11. The image acquisition device according to claim 10, wherein the main body comprises a base, and at least one of the identity document reading portion or the fingerprint reading portion is arranged on the base.

12. The image acquisition device according to claim 1, wherein the knob portion is provided with an adjustment scale for measuring an adjustment angle of the camera.

* * * * *